(12) United States Patent
Apfel

(10) Patent No.: US 7,215,764 B2
(45) Date of Patent: May 8, 2007

(54) CURRENT SENSING ECHO CANCELLATION DEVICE

(75) Inventor: Russell J. Apfel, Austin, TX (US)

(73) Assignee: Legerity, Inc., Austin, TX (US)

( * ) Notice: Subject to any disclaimer, the term of this patent is extended or adjusted under 35 U.S.C. 154(b) by 811 days.

(21) Appl. No.: 10/068,780

(22) Filed: Feb. 6, 2002

(65) Prior Publication Data

US 2002/0176570 A1 Nov. 28, 2002

(51) Int. Cl.
*H04M 1/00* (2006.01)
*H04M 9/00* (2006.01)

(52) U.S. Cl. ............... 379/399.01; 379/394; 379/398; 379/399.02

(58) Field of Classification Search ............ 379/402, 379/403, 404, 415, 417, 399.01, 399.02, 379/413.02, 394, 398
See application file for complete search history.

(56) References Cited

U.S. PATENT DOCUMENTS

| | | | | | |
|---|---|---|---|---|---|
| 4,431,874 | A | * | 2/1984 | Zobel et al. | 379/405 |
| 5,175,764 | A | * | 12/1992 | Patel et al. | 379/412 |
| 5,333,194 | A | * | 7/1994 | Caesar | 379/402 |
| 5,717,736 | A | * | 2/1998 | Vulih et al. | 379/3 |
| 5,734,712 | A | * | 3/1998 | Randahl | 379/382 |
| 5,974,363 | A | * | 10/1999 | Gammel et al. | 702/117 |
| 6,144,736 | A | * | 11/2000 | Koenig et al. | 379/399.02 |
| 6,400,187 | B1 | * | 6/2002 | Enriquez | 327/89 |
| 6,647,116 | B1 | * | 11/2003 | Gay | 379/405 |
| 6,700,975 | B1 | * | 3/2004 | Eriksson et al. | 379/399.01 |
| 6,731,751 | B1 | * | 5/2004 | Papadopoulos | 379/399.01 |
| 2003/0112963 | A1 | * | 6/2003 | Chen et al. | 379/399.01 |

\* cited by examiner

*Primary Examiner*—Matthew Anderson
*Assistant Examiner*—Tuan Pham
(74) *Attorney, Agent, or Firm*—Williams Morgan & Amerson

(57) ABSTRACT

A passive echo cancellation circuit for reducing echoes on a subscriber line includes an output driver adapted to drive a downstream signal on the subscriber line. First sensing circuitry is coupled to the output driver and adapted to sense a current on the subscriber line to generate a first voltage. A balancing network is adapted to receive at least a portion of the downstream signal. Second sensing circuitry is adapted to sense a current in the portion of the downstream signal passing through the balancing network to generate a second voltage. An upstream driver is adapted to subtract the second voltage from the first voltage to generate an upstream signal. A method for canceling echoes on a subscriber line includes driving a downstream signal on the subscriber line; sensing a current on the subscriber line to generate a first voltage; providing a portion of the downstream signal to a balancing network; sensing a current in the portion of the downstream signal passing through the balancing network to generate a second voltage; and subtracting the second voltage from the first voltage to generate an upstream signal.

46 Claims, 2 Drawing Sheets

CURRENT SENSING ECHO CANCELLATION DEVICE

BACKGROUND OF THE INVENTION

1. Field of the Invention

This invention relates generally to canceling echoes seen by transceivers when communicating data and/or voice signals, and, more particularly, to a current sensing echo cancellation device.

2. Description of the Related Art

Echo cancellation techniques are commonly employed in telephony applications to provide enhanced signal quality. Echo cancellation has been used in both voice and data applications. In general terms, a portion of the signal transmitted on a telephone line, otherwise known as a subscriber line, is reflected by the network and an attenuated version is seen as an input signal at the source. That is, an incoming signal received at the near end of the line will include both the signal originating from far end of the line (i.e., the desired message) and a portion of the signal previously sent at the near end of the line (i.e., an echo). This echo is present and deleteriously affects both data and voice transmission quality.

Telephone subscriber line cards provide the interface between the subscriber and the central office of the telephone company. Commonly, these line cards include circuitry adapted to remove or reduce the echo component to enhance signal quality. A typical subscriber line is a two-wire twisted pair cable. Within the central office, a four-wire arrangement is used to form a balancing network. The fundamental problem addressed by the echo control circuit of a telephone subscriber line card is the mismatch in the impedance characteristics of the two-wire subscriber loop and the balancing network. Because of the mismatch, some energy from the received far-end signal is reflected back at the 2 to 4 wire hybrid and turned into an unwanted near-end echo. To maximize the attenuation of a near-end echo various techniques have been employed.

A typical line card includes a subscriber line interface circuit (SLIC) coupled to the line and a coder/decoder (codec) circuit coupled to the SLIC. The codec receives the analog output of the SLIC and samples the output to generate a digital representation of the signal. The digital information is generally passed to a digital signal processor (DSP) for further processing (e.g., extraction of digital data). Digital data received from the DSP is converted to an analog form by the codec and subsequently sent back to the SLIC for transmission on the subscriber line.

One technique for canceling near-end echoes involves using a voltage summing circuit between the codec and the SLIC to scale the voltage of the signal being transmitted and subtracting that scaled voltage from the voltage of the input signal to cancel the echo. If the scaling factor applied to the transmit signal corresponds to the attenuation seen in the transmission line (i.e., the transmit signal travels from the near end to the far end and a portion is reflected back), the echo is reduced.

The voltage summing technique has several limitations. First, there is a delay imparted on the echo portion as it travels between the near and far ends. In voice band frequencies and lower frequency data bands this delay can be tolerated. However, as the frequency of the data signal increases (e.g., >100 kHz), this delay is significant and degrades the effectiveness of the echo canceling technique. A second limitation is that during the passage of the transmit signal through the SLIC, through the subscriber line, and back through the SLIC, noise and non-linearities are introduced. The original transmit signal does not contain noise and/or non-linearities. Hence, subtracting the original transmit signal from the receive signal including the echo leaves behind the noise and non-linearities.

Another technique employed to cancel echoes involves using digital signal processing algorithms to implement an adaptive digital filter. This technique requires that resources of the DSP be used to perform the adaptive filtering. In applications where the resource demands on the DSP are already great, such as in complex communications algorithms (e.g., asynchronous digital subscriber line), there are not sufficient resources remaining to implement a digital echo cancellation technique without compromising the data handling functions.

The present invention is directed to overcoming, or at least reducing the effects of, one or more of the problems set forth above.

SUMMARY OF THE INVENTION

One aspect of the present invention is seen in a passive echo cancellation circuit for reducing echoes on a subscriber line. The echo cancellation circuit includes an output driver adapted to drive a downstream signal on the subscriber line. First sensing circuitry is coupled to the output driver and adapted to sense a current on the subscriber line to generate a first voltage. A balancing network is adapted to receive at least a portion of the downstream signal. Second sensing circuitry is adapted to sense a current in the portion of the downstream signal passing through the balancing network to generate a second voltage. An upstream driver is adapted to subtract the second voltage from the first voltage to generate an upstream signal.

Another aspect of the present invention is seen in a method for canceling echoes on a subscriber line. The method includes driving a downstream signal on the subscriber line; sensing a current on the subscriber line to generate a first voltage; providing a portion of the downstream signal to a balancing network; sensing a current in the portion of the downstream signal passing through the balancing network to generate a second voltage; and subtracting the second voltage from the first voltage to generate an upstream signal.

BRIEF DESCRIPTION OF THE DRAWINGS

The invention may be understood by reference to the following description taken in conjunction with the accompanying drawings, in which like reference numerals identify like elements, and in which.

Figure 1:
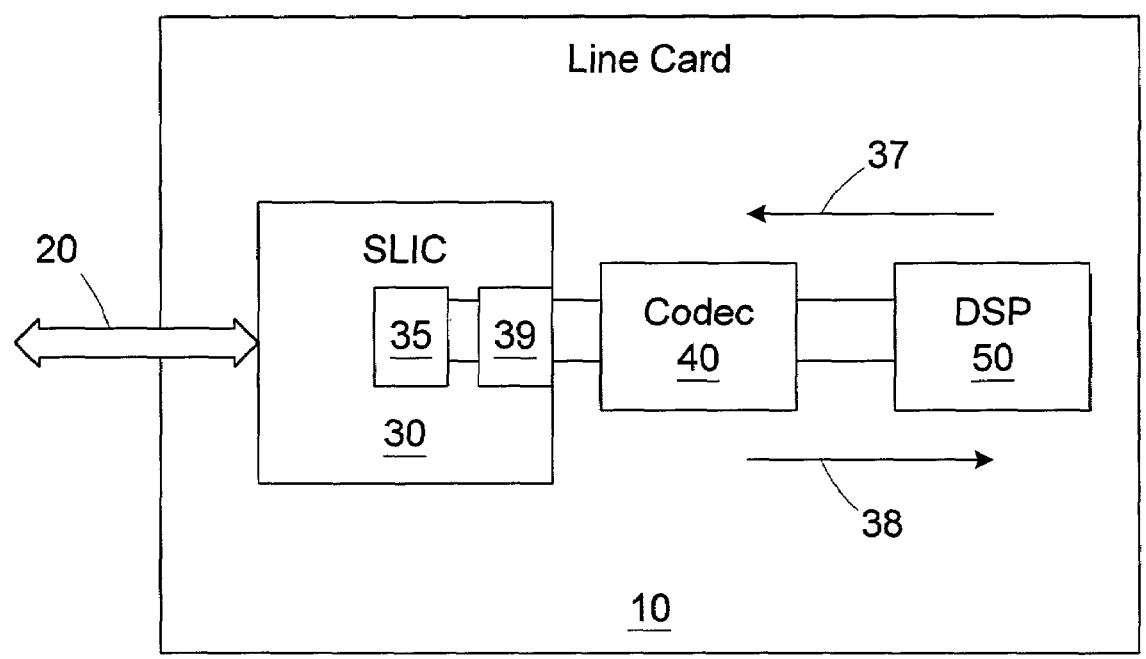
FIG. 1 is a simplified block diagram of a line card in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a line card 10 is provided. The line card 10 interfaces with a subscriber line 20. In an actual implementation, the line card 10 interfaces with a plurality of subscriber lines 20, but for clarity and ease of illustration, only one is shown. A subscriber line interface circuit (SLIC) 30 is coupled to the subscriber line 20. The SLIC 30 includes an echo cancellation circuit 35 adapted to cancel or at least reduce near-end echo signals received over the subscriber line 20. Hereinafter, signals received by the line card 10 over the subscriber line 20 are referred to as upstream signals (i.e., designated by an arrow 37), and signals transmitted by the line card 10 on the subscriber line 20 are referred to as downstream signals (i.e., designated by an arrow 38). The SLIC 30 includes an amplifier 39 for amplifying the analog upstream signal generated by the echo cancellation circuit 35.

The SLIC 30 supplies the analog upstream signal to a coder/decoder (codec) 40. The codec 40 receives the analog upstream signal and generates a digital upstream signal that is subsequently passed to a digital signal processor 50. The DSP 50 also provides a digital downstream signal for eventual transmission on the subscriber line 20. The codec 40 receives the digital downstream signal, converts it to an analog downstream signal, and provides the analog downstream signal to the SLIC 30, which sends the downstream analog signal over the subscriber line 20. The operation of the echo cancellation circuit 35 in canceling or reducing the echo signal is described in greater detail below in reference to FIG. 2. The echo cancellation circuit 35 uses a passive technique for canceling echoes prior to the amplifier 39.

In the illustrated embodiment, the line card 10 is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The construct and operation of the SLIC 30, codec 40, and DSP 50 for implementing their respective signal and/or data handling functions are well known to those of ordinary skill in the art, and for clarity and ease of illustration, they are not described in greater detail herein.

Figure 2:
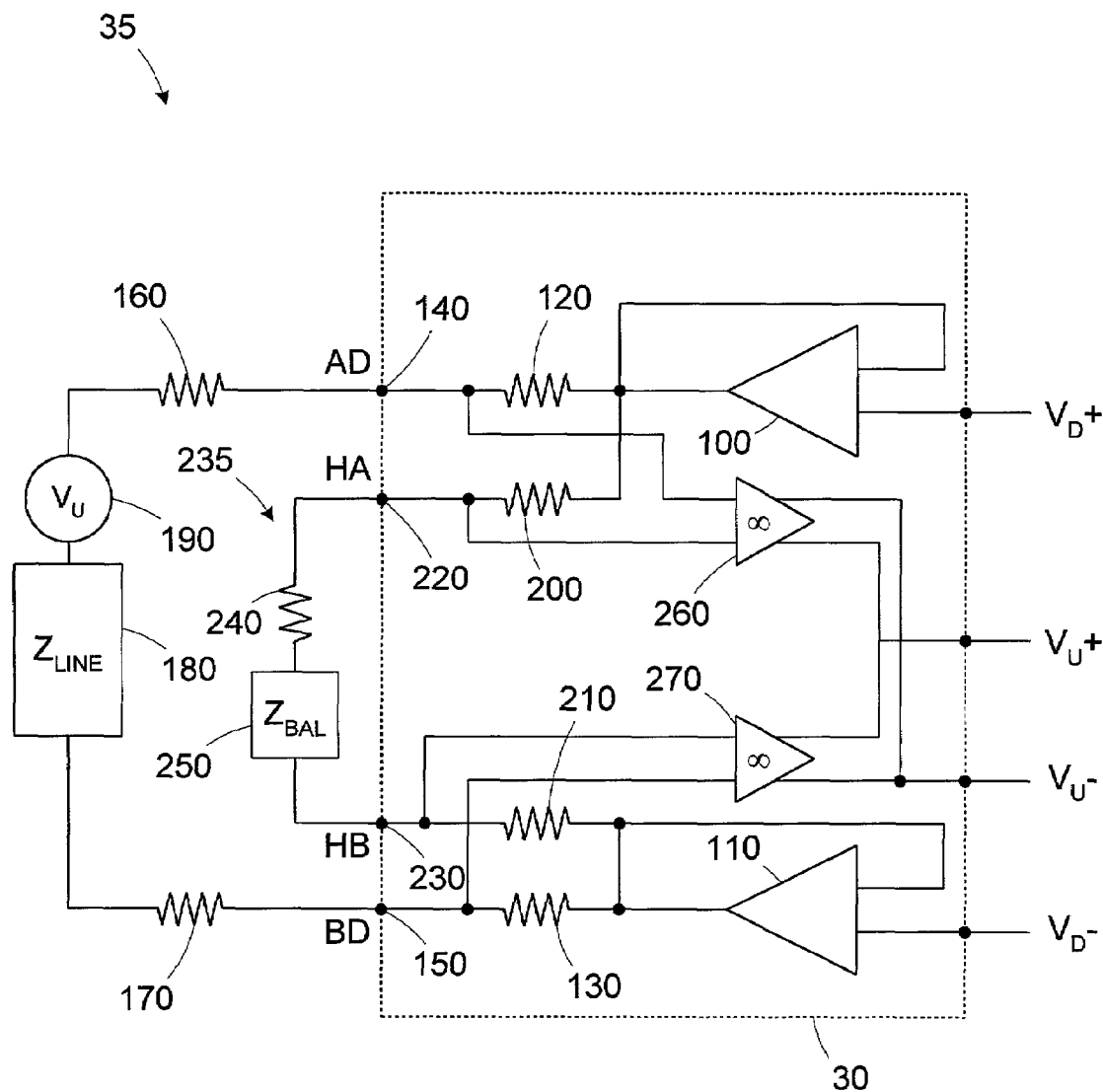
FIG. 2 is a circuit diagram of an echo cancellation circuit in a subscriber line interface chip of the line card of FIG. 1.

Turning now to FIG. 2, a circuit diagram of the echo cancellation circuit 35 is provided. The portion of the echo cancellation circuit 35 inside the dashed box represents those components residing on the SLIC 30. Transmit drivers 100, 110 receive differential components, $V_D+$ and $V_D-$, of the downstream signal provided by the codec 40 (shown in FIG. 1). The outputs of the transmit drivers 100, 110 are coupled to sensing resistors 120, 130, respectively. The voltage drop over the sensing resistors 120, 130 is proportional to the current of the downstream signal. Subscriber line output terminals 140, 150 ($V_{AD}$ and $V_{BD}$) of the SLIC 30 are coupled to protection resistors 160, 170. In the illustrated embodiment, the sensing resistors 120, 130 have a resistance, $R_S$, of about 15 ohms, and the protection resistors 160, 170 have a resistance, $R_{PROT}$, of about 35 ohms. Hence, the total output resistance of the line card 100 is 100 ohms, as is typically provided for in industry standards.

A subscriber line load ($Z_{LINE}$) 180 is shown to model the characteristics of the subscriber line 20. Typically, the subscriber line load 180 is modeled as a resistance (100 ohms) in series with the combination of a second resistance (~900 ohms) in parallel with a capacitance (having a break frequency of about 1 kHz). At higher frequencies (i.e., data band frequencies), the effects of the second resistance and capacitance tend to cancel each other, leaving an apparent load impedance of about 100 ohms. A voltage source 190 is shown to model the upstream signal, $V_U$, generated at the far end of the subscriber line 20.

The downstream drivers 100, 110 drive the downstream analog signal that is transmitted on the subscriber line 20. Due to impedance mismatches in the subscriber line 20, a portion of the downstream signal is reflected back and received as part of the upstream signal by the line card 10. The output terminals of the downstream drivers 100, 110 are coupled to scaled sensing resistors 200, 210, respectively. The scaled sensing resistors 200, 210 have a resistance, $NR_S$, equal to an integer multiple of the sensing resistors 120, 130. The voltage drop over the scaled sensing resistors 200, 210 represents a scaled version of the downstream signal current. In the illustrated embodiment, the scaling factor, N, is 100, although other scaling factors may be used. The effect of the scaling factor is to limit the power of the scaled downstream signal. For example, if the scaling factor is 100, the power diverted from the output drivers 100, 110 is only about 1%.

Balancing output terminals 220, 230 ($V_{HA}$ and $V_{HB}$) of the SLIC 30 are coupled to a balancing network 235 including a scaled protection resistor 240 having a resistance, $2NR_{PROT}$, of about 7 kohms and a balancing load ($Z_{BAL}$) 250. The scaled protection resistor 240 and the balancing load 250 model the characteristics of the subscriber line, albeit on a scaled down basis. In the illustrated embodiment, the balancing load 250 is a capacitor having a capacitance of about 1 nF with a series resistance of about 10 kohms, although other capacitance and resistance values may be used depending on the expected characteristics of the subscriber line 20. The scaled protection resistor 240 and the resistive component of the balancing load 250 may be combined in a single resistor (e.g., 17 kohms).

Although the balancing network 235 is illustrated as being external to the SLIC 30, it is contemplated that the balancing network 235 may be entirely or partially incorporated in the SLIC 30. In the illustrated embodiment, the balancing network 235 is external to the SLIC 30 to more closely simulate the conditions seen by the downstream signal as it exits through the output terminals 140, 150 to the subscriber line 20.

An upstream differential driver 260 receives as input signals the voltage at the output terminal of the sensing resistor 120 and the voltage at the output terminal of the scaled sensing resistor 200. Likewise, another upstream differential driver 270 receives as input signals the voltage at the output terminal of the sensing resistor 130 and the voltage at the output terminal of the scaled sensing resistor 210. The differential drivers 260, 270 have differential outputs. As will be shown mathematically below, if the balancing load 250 closely mirrors the subscriber line load 180, the output signals of the sensing resistors 120, 130 represent the combination of the upstream and downstream signals and the output signals of the scaled sensing resistors 200, 210 represent a scaled version of only the downstream signal as affected by the subscriber line 20 characteristics. Hence, the differential upstream drivers 260, 270 cancel the downstream echo, leaving the upstream signal, $V_U+$ and $V_U-$.

A small portion of the echo signal may still be present, because the balancing load 250 does not mirror the subscriber line characteristics perfectly. However, the effect of the echo is greatly reduced. The signals generated by the differential upstream drivers 260, 270 are illustrated by the following equations. For simplicity, only the equations for the positive component $V_U+$ are shown. Corresponding equations exist for the negative component, $V_U-$.

$$V_{AD} = V_D^+ \left[ \frac{R_S + 2R_{PROT} + Z_{LINE}}{2R_S + 2R_{PROT} + Z_{LINE}} \right] + V_D^- \left[ \frac{R_S}{2R_S + 2R_{PROT} + Z_{LINE}} \right] + \frac{V_U}{2} \left[ \frac{R_S}{R_S + 2R_{PROT} + Z_{LINE}/2} \right] \quad (1)$$

$$V_{HA} = V_D^+ \left[ \frac{NR_S + 2NR_{PROT} + Z_{BAL}}{2NR_S + 2NR_{PROT} + Z_{BAL}} \right] + V_D^- \left[ \frac{NR_S}{2NR_S + 2NR_{PROT} + Z_{BAL}} \right] \quad (2)$$

$$V_{AD} - V_{HA} = \frac{V_U}{2} \left[ \frac{R_S}{R_S + R_{PROT} + Z_{LINE}/2} \right] + V_D^+ \left[ \left( \frac{R_S + 2R_{PROT} + Z_{LINE}}{2R_S + 2R_{PROT} + Z_{LINE}} \right) - \left( \frac{NR_S + 2NR_{PROT} + Z_{BAL}}{2NR_S + 2NR_{PROT} + Z_{BAL}} \right) \right] + V_D^- \left[ \left( \frac{R_S}{2R_S + 2R_{PROT} + Z_{LINE}} \right) - \left( \frac{NR_S}{2NR_S + 2NR_{PROT} + Z_{BAL}} \right) \right] \quad (3)$$

If the balancing network 235 closely mirrors the subscriber line 20, the $V_D+$ and $V_D-$ terms in equation 3 go to zero, leaving the upstream signal.

The echo cancellation circuit 35 operates in a current sensing mode. In general terms, the technique employed in the echo cancellation circuit 35 includes driving a downstream signal on the subscriber line; sensing a current on the subscriber line to generate a first voltage; providing a portion of the downstream signal to a balancing network; sensing a current in the portion of the downstream signal passing through the balancing network to generate a second voltage; and subtracting the second voltage from the first voltage to generate an upstream signal.

Current sensing is more accurate than previously employed voltage summing methods. Also, because the sensing is conducted inside the SLIC 30 at the transmit drivers 100, 110, the delay problem associated with the prior technique is substantially reduced. Also, because the downstream signal and the scaled downstream signal used for echo cancellation are subjected to the same circuitry, noise and non-linearities are equally imposed. Hence, the echo cancellation circuit 35 also substantially reduces these factors. The passive echo cancellation technique described herein has numerous advantages. Because the echo cancellation is performed prior to the amplification stage (i.e., in the amplifier 39), distortion is reduced due to the smaller signal amplitude resulting from the echo cancellation. The passive echo cancellation technique also reduces noise in the upstream signal. The passive nature of the circuit also results in a reduced cost and reduced power consumption due to a reduction in the amount of circuitry required.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A passive echo cancellation circuit for reducing echoes on a subscriber line, comprising:
   an output driver adapted to drive a downstream signal on the subscriber line;
   a first sensing circuitry coupled to the output driver and being adapted to sense a current on the subscriber line to generate a first voltage;
   a balancing network adapted to receive at least a portion of the downstream signal;
   a second sensing circuitry adapted to sense a current in the portion of the downstream signal passing through the balancing network to generate a second voltage; and
   an upstream driver adapted to subtract the second voltage from the first voltage to generate an upstream signal.

2. The circuit of claim 1, wherein the balancing network comprises a balancing load corresponding to an expected load on the subscriber line.

3. The circuit of claim 2, wherein the balancing network further comprises a protection resistor.

4. The circuit of claim 1, wherein the output driver, first and second sensing circuitries, and upstream driver are contained in a subscriber line interface circuit chip.

5. The circuit of claim 4, wherein the balancing network is external to the subscriber line interface circuit chip.

6. The circuit of claim 1, wherein the first sensing circuitry comprises a sensing resistor coupled between the output driver and the subscriber line.

7. The circuit of claim 6, wherein an output terminal of the sensing resistor is coupled to the upstream driver to provide the first voltage.

8. The circuit of claim 1, wherein the second sensing circuitry comprises a sensing resistor coupled between the output driver and the balancing network.

9. The circuit of claim 8, wherein an output terminal of the sensing resistor is coupled to the upstream driver to provide the second voltage.

10. The circuit of claim 1, wherein the first sensing circuitry comprises a first sensing resistor coupled between the output driver and the subscriber line, an output terminal of the resistor is coupled to the upstream driver to provide the first voltage, the second sensing circuitry comprises a second sensing resistor coupled between the output driver and the balancing network, and an output terminal of the second sensing resistor is coupled to the upstream driver to provide the second voltage.

11. The circuit of claim 4, wherein the subscriber line interface circuit chip comprises an output terminal coupled to the subscriber line, and the circuit further comprises a protection resistor coupled between the output terminal and the subscriber line.

12. A line card for coupling to a subscriber line, comprising:
    a balancing network; and
    a subscriber line interface circuit adapted to drive a downstream signal on the subscriber line and receive an upstream signal on the subscriber line, the subscriber line interface circuit comprising:

a first output terminal coupled to the subscriber line;

an output driver coupled to the output terminal and adapted to drive the downstream signal on the subscriber line;

first sensing circuitry coupled to the output driver adapted to sense a current on the subscriber line to generate a first voltage;

a second output terminal coupled to the balancing network to provide at least a portion of the downstream signal to the balancing network;

second sensing circuitry adapted to sense a current in the portion of the downstream signal passing through the balancing network to generate a second voltage; and an upstream driver adapted to subtract the second voltage from the first voltage to generate the upstream signal.

13. The line card of claim 12, wherein the balancing network comprises a balancing load corresponding to an expected load on the subscriber line.

14. The line card of claim 13, wherein the balancing network further comprises a protection resistor.

15. The line card of claim 12, wherein the first sensing circuitry comprises a sensing resistor coupled between the output driver and the subscriber line.

16. The line card of claim 12, wherein the second sensing circuitry comprises a sensing resistor coupled between the output driver and the balancing network.

17. The line card of claim 16, wherein an output terminal of the sensing resistor is coupled to the upstream driver to provide the second voltage.

18. The line card of claim 12, wherein the first sensing circuitry comprises a first sensing resistor coupled between the output driver and the subscriber line, an output terminal of the resistor is coupled to the upstream driver to provide the first voltage, the second sensing circuitry comprises a second sensing resistor coupled between the output driver and the balancing network, and an output terminal of the sensing resistor is coupled to the upstream driver to provide the second voltage.

19. The line card of claim 12, subscriber line interface circuit further comprises a protection resistor coupled between the second output terminal and the subscriber line.

20. The line card claim 12, wherein the subscriber line interface circuit further comprises an amplifier coupled to the echo cancellation circuit and being adapted to amplify the upstream signal.

21. A method for canceling echoes on a subscriber line, comprising:

driving a downstream signal on the subscriber line;

sensing a current on the subscriber line to generate a first voltage;

providing a portion of the downstream signal to a balancing network;

sensing a current in the portion of the downstream signal passing through the balancing network to generate a second voltage; and subtracting the second voltage from the first voltage to generate an upstream signal.

22. The method of claim 21, further comprising providing a balancing load of the balancing network corresponding to an expected load on the subscriber line.

23. The method of claim 22, wherein providing the balancing network further comprises providing a protection resistor.

24. The method of claim 21, wherein driving the downstream signal comprises driving the downstream signal with an output driver.

25. The method of claim 24, wherein sensing the current on the subscriber line comprises providing a sensing resistor between the output driver and the subscriber line.

26. The method of claim 25, wherein sensing the current on the subscriber line comprises coupling an output terminal of the sensing resistor to an upstream driver to provide the first voltage.

27. The method of claim 24, wherein sensing the current in the portion of the downstream signal passing through the balancing network comprises providing a sensing resistor between the output driver and the balancing network.

28. The method of claim 27, wherein sensing the current in the portion of the downstream signal passing through the balancing network comprises coupling an output terminal of the sensing resistor to an upstream driver to provide the second voltage.

29. The method of claim 24, wherein sensing the current on the subscriber line comprises providing a first sensing resistor coupled between the output driver and the subscriber line, an output terminal of the resistor being coupled to an upstream driver to provide the first voltage, and sensing the current in the portion of the downstream signal passing through the balancing network comprises providing a second sensing resistor coupled between the output driver and the balancing network, an output terminal of the second sensing resistor being coupled to the upstream driver to provide the second voltage.

30. The method of claim 29, wherein providing the second sensing resistor comprises providing the second sensing resistor having a resistance equal to a multiple of the resistance of first sensing resistor.

31. The method of claim 30, wherein providing the second sensing resistor comprises providing the second sensing resistor having a resistance equal to about 100 times the resistance of first sensing resistor.

32. The method of claim 21, further comprising amplifying the upstream signal.

33. A passive echo cancellation circuit for reducing echoes on a subscriber line having first and second differential lines, comprising:

a first output driver coupled to the first differential line and being adapted to drive a first component of a downstream signal on the first differential line;

a second output driver coupled to the second differential line and being adapted to drive a second component of the downstream signal on the second differential line;

first sensing circuitry coupled to the first output driver and being adapted to sense a current on the first differential line to generate a first voltage;

second sensing circuitry coupled to the second output driver and being adapted to sense a current on the second differential line to generate a second voltage;

a balancing network coupled between the first and second differential lines and being adapted to receive at least a portion of the downstream signal;

third sensing circuitry adapted to sense a current in the portion of the first component of the downstream signal passing through the balancing network to generate a third voltage; and fourth sensing circuitry adapted to sense a current in the portion of the second component of the downstream signal passing through the balancing network to generate a fourth voltage;

a first upstream driver adapted to subtract the third voltage from the first voltage to generate a first differential component of an upstream signal; and a second upstream driver adapted to subtract the fourth voltage from the second voltage to generate a second differential component of the upstream signal.

34. The circuit of claim 33, wherein the balancing network comprises a balancing load corresponding to an expected load on the subscriber line.

35. The circuit of claim 34, wherein the balancing network further comprises a protection resistor.

36. The circuit of claim 33, wherein the first and second output drivers, first, second, third, and fourth sensing circuitries, and the first and second upstream drivers are contained in a subscriber line interface circuit chip.

37. The circuit of claim 36, wherein the balancing network is external to the subscriber line interface circuit chip.

38. The circuit of claim 33, wherein the first sensing circuitry comprises a first sensing resistor coupled between the first output driver and the first differential line, and the second sensing circuitry comprises a second sensing resistor coupled between the second output driver and the second differential line.

39. The circuit of claim 38, wherein an output terminal of the first sensing resistor is coupled to the first upstream driver to provide the first voltage, and an output terminal of the second sensing resistor is coupled to the second upstream driver to provide the second voltage.

40. The circuit of claim 33, wherein the third sensing circuitry comprises a first sensing resistor coupled between the first output driver and the balancing network, and the fourth sensing circuitry comprises a second sensing resistor coupled between the second output driver and the balancing network.

41. The circuit of claim 40, wherein an output terminal of the first sensing resistor is coupled to the first upstream driver to provide the third voltage, and an output terminal of the second sensing resistor is coupled to the second upstream driver to provide the fourth voltage.

42. A passive echo cancellation circuit for reducing echoes on a subscriber line having first and second differential lines, comprising:

a first output driver coupled to the first differential line and being adapted to drive a first component of a downstream signal on the first differential line;

a second output driver coupled to the second differential line and being adapted to drive a second component of the downstream signal on the second differential line;

a first sensing resistor coupled to the first output driver;

a second sensing resistor coupled to the second output driver;

a balancing network coupled between the first and second differential lines;

a third sensing resistor coupled between the first output driver and the balancing network;

a fourth sensing resistor coupled between the second output driver and the balancing network;

a first upstream driver coupled to the first sensing resistor and the third sensing resistor and being adapted to generate a first differential component of an upstream signal; and a second upstream driver coupled to the second sensing resistor and the fourth sensing resistor and being adapted to generate a second differential component of the upstream signal.

43. A passive echo cancellation circuit for reducing echoes on a subscriber line, comprising:

an output driver adapted to drive a downstream signal on the subscriber line;

a first sensing circuitry coupled to the output driver and being adapted to sense a current on the subscriber line to generate a first voltage, wherein the first sensing circuitry comprises a first sensing resistor coupled between the output driver and the subscriber line, an output terminal of the resistor is coupled to the upstream driver to provide the first voltage;

a balancing network adapted to receive at least a portion of the downstream signal;

a second sensing circuitry adapted to sense a current in the portion of the downstream signal passing through the balancing network to generate a second voltage, second sensing circuitry comprises a second sensing resistor coupled between the output driver and the balancing network, and an output terminal of the second sensing resistor is coupled to the upstream driver to provide the second voltage; and an upstream driver adapted to subtract the second voltage from the first voltage to generate an upstream signal.

44. The circuit of claim 43, wherein the balancing network comprises a balancing load corresponding to an expected load on the subscriber line.

45. The circuit of claim 44, wherein the balancing network further comprises a protection resistor.

46. The circuit of claim 43, wherein the second sensing circuitry comprises a sensing resistor coupled between the output driver and the balancing network.

* * * * *